United States Patent [19]

Sadri

[11] Patent Number: 4,950,115
[45] Date of Patent: Aug. 21, 1990

[54] BLIND FASTENER WITH EXPANDABLE SLEEVE FORMING A BLIND BULBED HEAD WITH LARGE BEARING AREA AND A PIN HAVING A CONTROLLED PROTRUSION LENGTH

[75] Inventor: Shahriar M. Sadri, El Torro, Calif.

[73] Assignee: Huck Manufacturing Company, Irvine, Calif.

[21] Appl. No.: 415,744

[22] Filed: Oct. 2, 1989

[51] Int. Cl.$^5$ ............................................. F16B 13/04
[52] U.S. Cl. ..................................... 411/38; 411/43; 411/55
[58] Field of Search .................................. 411/34–38, 411/43, 55, 70, 69

[56] References Cited

U.S. PATENT DOCUMENTS

| | | |
|---|---|---|
| 3,345,900 | 10/1966 | Villo . |
| 4,033,222 | 7/1977 | Wilson . |
| 4,168,650 | 9/1979 | Dahl et al. ............................ 411/43 |
| 4,203,346 | 5/1980 | Hall et al. . |
| 4,364,697 | 12/1982 | Binns ................................... 411/43 |
| 4,457,652 | 7/1984 | Pratt .................................... 411/38 |

Primary Examiner—Neill R. Wilson
Attorney, Agent, or Firm—Lawrence J. Shurupoff

[57] ABSTRACT

A blind fastener for fastening workpieces of a crushable or composite material and which provides a blind head having a large bearing area against the adjacent blind side of the workpieces and having a main sleeve with a tapered nose and an expandable sleeve with the expandable sleeve having a primary section and a secondary section with the secondary section having a wall of reduced cross-sectional area and of a lower hardness and/or material strength than the primary section such that after the secondary section has moved past and been expanded over the tapered nose the leading end of the primary section will substantially not move radially inwardly as it is moved over the tapered nose and at a preselected axial or column load the secondary section will substantially fold or collapse to form the blind head with a large bearing area while the primary section will substantially not buckle whereby the pin can provide a visual and/or measurable indication that the fastener has been installed in a proper grip condition.

26 Claims, 3 Drawing Sheets

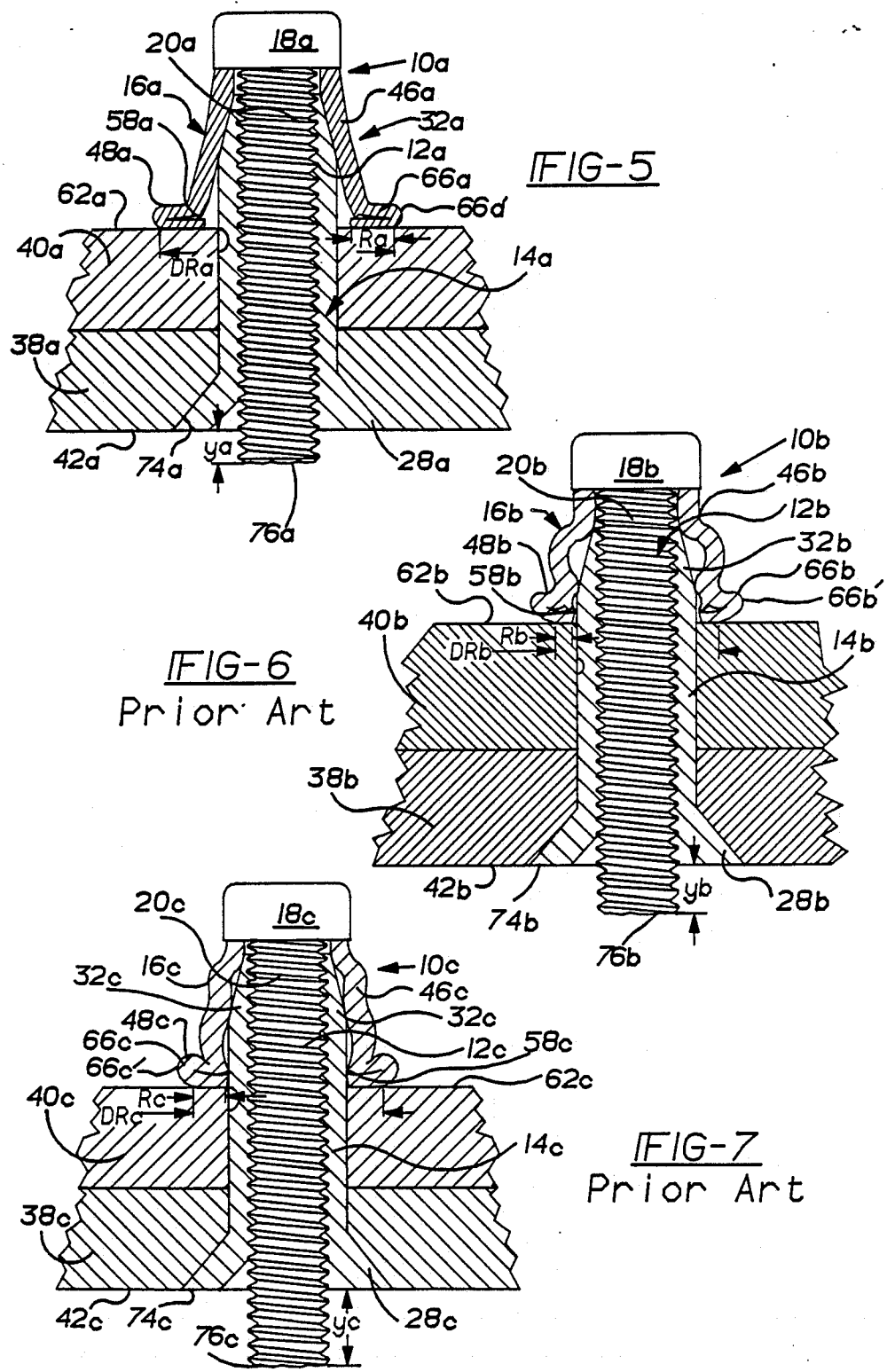

BLIND FASTENER WITH EXPANDABLE SLEEVE FORMING A BLIND BULBED HEAD WITH LARGE BEARING AREA AND A PIN HAVING A CONTROLLED PROTRUSION LENGTH

SUMMARY BACKGROUND OF THE INVENTION

The present invention relates to blind fasteners for securing workpieces of a crushable or composite material and more particularly to a blind fastener providing a blind head with a large effective bearing surface on the blind side of such workpieces.

In certain applications, especially those involving workpieces of crushable or composite materials, it is desirable to utilize a blind fastener providing a large bearing area under the blind head. The large bearing or surface area around the workpiece opening on the blind side assists in inhibiting localized crushing and flaking of the workpiece material engaged by the blind head.

Fasteners generally of the type of the present invention are shown in U.S. Pat. No. 3,345,900 to J. P. Villo issued Oct. 10, 1966, U.S. Pat. No. 4,033,222 to L. B. Wilson, issued July 5, 1977, U.S. Pat. No. 4,168,650 to W. F. Dahl, et al, issued Sept. 25, 1979, U.S. Pat. No. 4,457,652 to J. D. Pratt, issued July 3, 1984 and U.S. Pat. No. 4,203,346 to D. E. Hall et al, issued May 20, 1980.

The preceding patents generally disclose a multipiece fastener including a main sleeve or nut member and an expandable sleeve which forms a blind head as it is axially moved by a pin member over the blind end of the main sleeve. The '900 patent to Villo generally shows this type of structure but the resultant fastener does not form a blind head having a large bearing area or "footprint". The '222 patent to Wilson shows a structure including three expandable sleeves utilized in an effort to provide a blind head having a large bearing area. The '650 patent to Dahl et al and '652 patent to Pratt each show an expandable sleeve having a reduced section portion at the leading end which bulbs radially outwardly to ostensibly provide a large bearing area. A variation of these structures is shown in the '346 patent to Hall et al where the reduced section portion engages a shoulder on the pin member.

Frequently fasteners of this type have expandable sleeves which are solution treated, annealed or otherwise softened to a reduced, uniform hardness to minimize installation forces on the blind side of the workpiece of crushable or composite material. In some cases, the expandable sleeve has a primary section of one wall thickness or cross-section and a secondary section of reduced wall thickness or cross-section. The main sleeve or nut member has a tapered nose portion at its blind side. In setting the fastener, the expandable sleeve is radially expanded as it moves axially over the tapered nose portion via a relative axial pulling force applied between the pin member and the nut member. The blind head is formed by folding of the secondary section as it engages the workpiece surface. One of the problems with such fasteners is that the softened, expandable sleeves do not consistently provide, if at all, a blind head having the desired large bearing area against the engaged workpiece surface. This is due to radial inward movement of the leading end of the primary sleeve section as it moves axially over the tapered nose portion of the main sleeve. It is believed that this deformation occurs in response to hoop stresses resulting from the initial radial expansion.

In the present invention, it has been found that a large blind side bearing area can be achieved by providing an expandable sleeve structure having its primary section to be of a higher hardness than the secondary section and thus to have a greater resistance to hoop stresses imposed during installation; as noted it is the hoop stresses present during installation which cause radial inward deformation of the softened sleeves of the prior art. Thus the magnitude of the lower hardness of the secondary section will be selected to promote folding for formation of the blind head at the desired installation load; at the same time, the magnitude of the higher hardness of the primary section will be selected to inhibit radial inward deformation of that section resulting in the formation of the blind head with large bearing area by the secondary section.

The fastener of the present invention is constructed to be set by a relative axial force applied between the pin on the one hand and the main sleeve and expandable sleeve on the other hand whereby the expandable sleeve is moved over the tapered blind end or nose portion of the main sleeve. In this way the secondary sleeve section will be radially expanded first and moved axially until its free end engages the blind side of the workpieces. The secondary sleeve section is and remains integrally connected to the primary sleeve section; when the axial or column load attains a preselected magnitude the secondary sleeve section will fold to form a blind, bulbed head having a large effective bearing area whereby localized crushing of the engaged workpiece is inhibited. The relative axial load continues to increase until the pin fractures at a breakneck groove severing a pintail portion of the pin leaving a pin shank of a predetermined minimal length.

During the installation, the leading end of the primary sleeve section will be radially expanded as it moves axially over the tapered nose portion of the main sleeve. The higher hardness, and hence strength, of the primary section will resist and substantially preclude radial inward deformation of that section throughout the installation whereby the final formation of a blind head of desired large bearing area by the softer secondary sleeve section will be promoted. By contrast, with prior, solution treated or softened sleeves the blind head in some conditions can be partially deflected away from the engaged workpiece surface by the radially inward movement of the primary sleeve section thereby reducing the effective size and integrity of the footprint of the blind head.

Fasteners of the type of the present invention are provided in different diameters and in different lengths to accommodate workpieces varying in thickness. The nominal total thickness of workpieces to be secured by a fastener of a given length is considered to be the "grip" of that fastener. It is desirable that a fastener of such given length or "grip" can be used to clamp or secure workpieces varying in total thickness over a predetermined range. The noted range is considered to be the "grip range" of the fastener. With the fastener construction of the present invention, the desired large 'footprint' and hence large effective engaged area of the blind head can be provided by the fastener of a given length (or grip) for joining workpieces varying in total thickness over a considerable grip range. In this regard, it is also desirable that the installed fastener provide an indication that the fastener with proper grip has been installed with workpieces within its grip range; the most effective means of indication of the use of a fastener of correct or incorrect grip is the final position of the pin. With prior constructions of generally uniform low hardness, selected to reduce the load to fold and collapse the secondary sleeve section, it was possible for the primary softened sleeve section to buckle. When such buckling of the primary sleeve section occurs, it is not possible to use the final position of the pin on the open or installation side to indicate or flag the correctness of the grip of the fastener. Such buckling of the primary sleeve section is substantially eliminated with the present invention resulting in a fastener having the capability of indicating or flagging the correctness of the grip in which it is used.

In this regard, it should be noted that with the solution treated or softened sleeves the buckling could be such that the axial travel of the pin would continue until the pin head engaged the nose or tapered end of the main sleeve or nut member. When this occurs the operator or inspector on the open side of the workpieces, by visual inspection, could erroneously conclude from the overtravel of the pin that a fastener with incorrect grip was used. In other circumstances the operator or inspector could fail to detect that the fastener was used in an incorrect grip. With the present invention the total amount of pin travel is controlled since the primary section of the expandable sleeve will not buckle; thus, over the selected grip range of the fastener of a given grip, the pin break location will occur near the outer sheet line or surface of the outer workpiece with a maximum grip condition and at a determinable distance beyond the outer sheet line with a minimum grip condition. Any deviation from these extremes will indicate or flag an improper or undesirable grip condition for the set fastener. In this way, the present invention provides a visual and/or measurable indication that the fastener of proper grip has been used.

Another problem with overtravel of the pin with solution treated or fully softened constructions is the potential for breaking the pin head off as it engages or stalls near the nose of the main sleeve; this is avoided by the controlled pin travel provided by the present invention.

Fasteners of this type are utilized to secure workpieces being predominantly subjected to shear loads rather than tensile loads. In a lap shear type joint, however, there is also a twisting or bending load being applied which has a tensile component. Thus the magnitude of shear load capacity of such fasteners will be influenced by its ability to withstand the combination loading applied resulting from twisting and/or bending loads. In the present invention, the resultant larger footprint of the blind head plus the higher hardness of the primary sleeve portion and its general freedom from buckling provides a fastener construction having a greater resistance to the twisting or bending loads and hence provides a higher shear load capability than fasteners utilizing the softened construction.

Thus it is an object of the present invention to provide a blind fastener for fastening workpieces of a crushable or composite material and which provides a blind head having a large bearing area against the adjacent blind side of the workpieces.

It is another object of the present invention to provide a blind fastener of the above described type having a main sleeve and an expandable sleeve with the expandable sleeve having a secondary section of reduced cross-section which is of a lower hardness than the remainder or primary section of the expandable sleeve such that the secondary sleeve section can fold to form the blind head while the primary section can resist radial inward deformation at the axial loads necessary to set the fastener whereby the blind head will be formed with a desired large bearing area.

It is still another object of the present invention to provide a blind fastener of the above described type in which buckling of the primary sleeve section is precluded whereby the travel of the pin over the selected grip range of the fastener is predictable for a proper installation thereby providing a visual and/or measurable indication of the correctness of the grip in which the fastener is set.

It is another general object to provide a new and unique blind fastener constructed to provide a blind, bulbed head having an enlarged bearing area.

Other objects, features, and advantages of the present invention will become apparent from the subsequent description and the appended claims, taken in conjunction with the accompanying drawings.

DESCRIPTION OF THE DRAWINGS

FIG. 5 is a view similar to that of FIG. 3 depicting the fastener of FIGS. 1–4 after it has been set and fastening workpieces of a minimum total thickness;

FIG. 6 is a view similar to that of FIG. 3 and depicting a fastener constructed in accordance with the prior art after it has been set and fastening workpieces of a maximum total thickness; and FIG. 7 is a view similar to that of FIG. 5 and depicting the prior art fastener of FIG. 6 after it has been set and fastening workpieces of a minimum total thickness.

DESCRIPTION OF THE PREFERRED EMBODIMENTS

Figure 1:
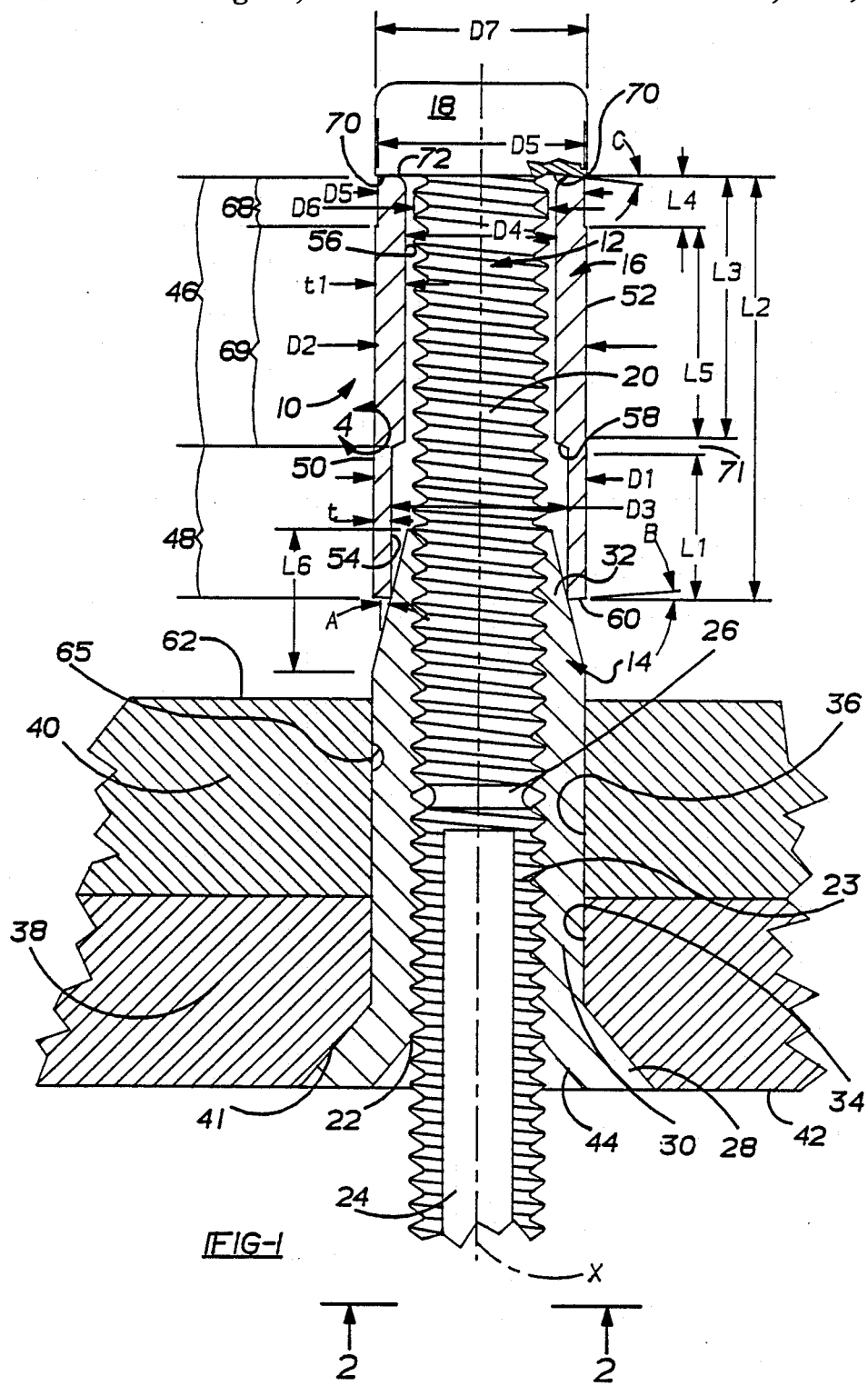
FIG. 1 is an elevational view with some parts shown in section of a fastener embodying features of the present invention and in assembly relationship with a pair of workpieces of maximum total thickness to be fastened together and including a main sleeve, an expandable sleeve and a pin member.
Figure 2:
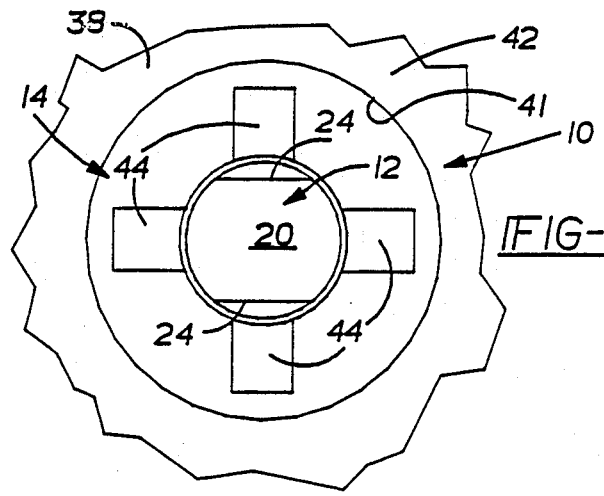
FIG. 2 is an end view of the assembly of FIG. 1 taken in the direction of the arrow 2.

Looking now to FIG. 1, a multipieced fastener 10 includes a pin member 12, a main sleeve or nut member 14 and an expandable sleeve 16. Pin member 12 has an enlarged head 18 at one end and a threaded pin shank 20. A pintail portion 23 is connected to the threaded shank portion 20 via a breakneck groove 26 and is formed with a thread which is continuous with that of shank portion 20. The threaded shank portions 20 and 23 are adapted to threadably engage mating threads in a through bore 22 of main sleeve 14. By applying torque between the pin member 12 and the main sleeve 14, the expandable sleeve 16, which is located on the shank portion 20 adjacent the pin head 18, will be moved axially relative to the main sleeve 14. In the construction shown, a pair of diametrically opposed flats 24 are provided on pin member 12 on the pintail portion 23 for accepting the chuck of a power tool (not shown)

adapted to apply torque between the pin member 12 and main sleeve 14. The annular breakneck groove 26 is of a reduced cross-sectional area which is designed to fracture at a predetermined axial or torsional load. The breakneck groove 26 is of an annular construction formed in a manner so as not to interfere with the threading of the pin 12 into the bore 22 of the main sleeve 14.

It should be understood that the fastener 10 could be constructed as a pull type fastener with the pin member 12 having a generally smooth shank and a plurality of circumferential pull grooves on the free end of pin shank 19 instead of external threads and without mating threads in main sleeve or nut member 14. Such pull grooves are commonly employed on similar pulling pin structures and are formed to be gripped by conventional pull-type tools for exerting the necessary axial force on pin member 12.

The main sleeve 14 is of a flush head type and includes an enlarged conical head 28, a straight shank portion 30 of generally constant outside diameter and a tapered nose portion 32. In one form of the invention the tapered nose portion 32 can be formed with an angle A of between around 13° to around 17° with a line parallel with the axis X of the threaded bore 22 and of the fastener 10. An angle A of between around 10° to around 25° can be employed. The shank portion 30 of main sleeve 14 extends through aligned openings 34 and 36 in a pair of workpieces 38 and 40, respectively, with the flush head 28 designed to seat within a countersunk opening 41 in the outer or accessible surface 42 of workpiece 38. The outside diameter of shank portion 30 of main sleeve 14 is selected to fit through the aligned openings 34 and 36 with a relatively close tolerance fit. In this regard the outside diameter of the expandable sleeve 16 and pin head 18 can be accepted through the openings 34 and 36 in a clearance relationship. It is to be understood that while a flush head 28 is shown other configurations such as a protruding head may be used.

As noted the fastener 10 is particularly useful where the workpieces 38 and 40 are constructed of crushable materials such as composites, or the like. The composite materials for example can be of a graphite/thermoset resin or graphite/thermoplastic resin structure.

The expandable sleeve 16 includes a primary sleeve section 46 adjacent the pin head 18 and a secondary sleeve section 48 having a wall of reduced thickness or cross-sectional area located adjacent the tapered nose portion 32 of main sleeve 14. Secondary sleeve section 48 has an outer surface 50 of a diameter D1 which is slightly larger than the diameter D2 of outer surface 52 of primary sleeve section 46. In one form of the invention diameter D1 was around 0.6% to around 1% larger than diameter D2. This slight difference in diameter is a result of a selective cold working operation via rolling to be described and results in an outer transition surface 7. Also the inside diameter D3 of bore or bore surface 54 of secondary sleeve section 48 is greater than the inside diameter D4 of bore or bore surface 56 of primary sleeve section 46. Thus the secondary sleeve section 48 defines a cylindrical column having a wall thickness 't' which is substantially less than the wall thickness 't1' of the primary sleeve section 46; in this regard, the inner surface 54 of secondary sleeve section 48 is substantially radially offset from the inner surface 56 of the primary sleeve section 46. The inner surface 56 of the primary sleeve section 46 terminates at the juncture with the inner surface 54 of the secondary sleeve section 48 in a a slightly chamfered inner surface 58.

In order to set the fastener 10, a relative axial force is exerted by torquing the pin member 12 relative to the main sleeve 14 and expandable sleeve 16. In this regard the flush head 28 may include recesses 44 adapted to accept a portion of the power tool (not shown) to hold the main sleeve or nut member 14 from rotating during setting of the fastener assembly 10.

Figure 3:
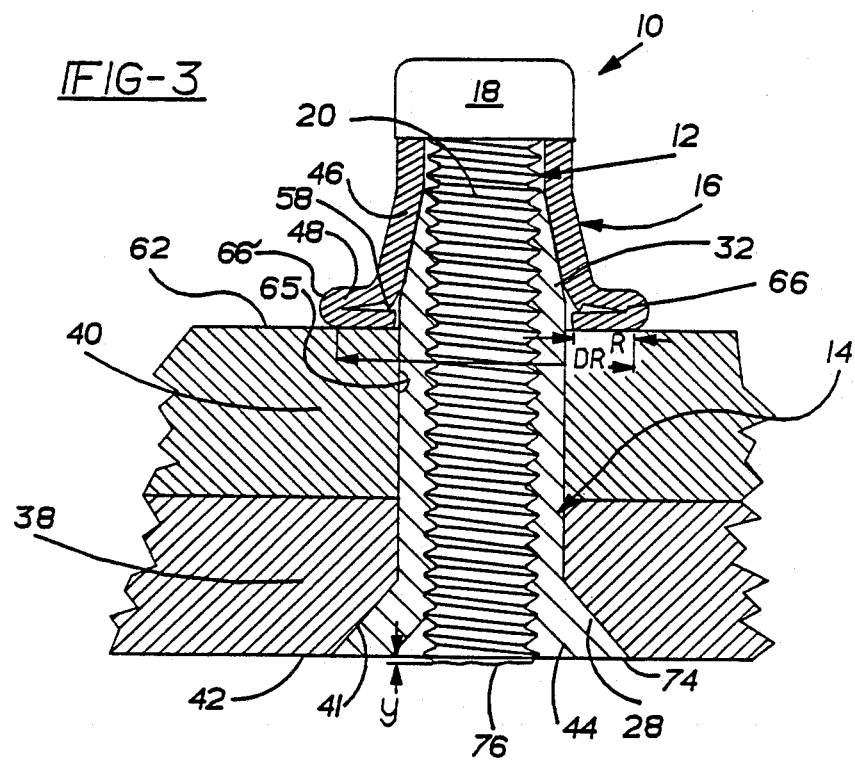
FIG. 3 is an elevational view with some parts shown in section of the fastener of FIG. 1 after it has been set.

The free end 60 of expandable sleeve 16 engages the tapered nose 32 on main sleeve 14, and as the secondary sleeve section 48 moves axially to overengage the surface of the tapered nose 32 it is radially expanded. The secondary sleeve section 48 continues to move axially until the free end 60 moves past and separates from the tapered nose 32; at this point the free end 60 of the secondary sleeve section 48 begins to move radially inwardly in response to hoop stresses. This action continues until the free end 60 engages the blind side surface 62 of workpiece 40. This engagement, in a sense, defines a stop surface. As more torque is applied to pin member 12, the axial column load on the secondary sleeve section 48 will increase until folding of the secondary sleeve section 48 begins. As the leading end 58 of the hardened primary sleeve section 46 moves along and past the tapered nose portion 32, without radial inward movement, it guides the secondary sleeve section 48 to move the fold line radially outwardly resulting in a large diameter footprint. The "fold line" is the point at which the secondary sleeve section 48 folds over on itself and it shown as the radially outer extent 66' of the blind head 66 (FIG. 3). The secondary sleeve section 48 continues to fold until it is substantially completely collapsed to define the blind head 66 in substantially full circumferential, planar engagement with the blind side surface 62 of workpiece 40 (see FIG. 3). This maximum diameter, substantially fully engaged bulbed head is typically around 1.5 times or greater than the original unexpanded diameter D1 of secondary sleeve section 48. The radial length R of the footprint or engaged surface of the blind head 66 is shown in FIG. 3 which also indicates the blind head 66 to have a large outside diameter DR.

Continued torquing of pin member 12 causes the pin to fracture at breakneck groove 26, resulting in separation of the pintail portion 23; as a result of the larger cross-section and increased hardness of the primary sleeve section 46 relative to the secondary sleeve section 48, the primary sleeve section 46 will not buckle at the applied installation loads and hence the combination will produce the final assembled joint shown in FIG. 3. In this condition the workpieces 38 and 40 are secured together at a desired clamp load.

Some form of locking configuration may be provided between pin member 12 and main sleeve 14 to keep the pin member from rotating and separating axially after the fastener 10 is set and hence to maintain the preload in the fastened joint. Thus as shown in FIG. 1, the main sleeve 14, after its initial assembly to pin 12, is deformed radially inwardly as at 65 to provide a preselected interference between the threads of threaded bore 22 and those of pin 12. This interference acts to hold the assembled parts of the fastener 10 together before installation and provides a prevailing torque feature resisting threaded separation after installation.

It should be understood that the leading edge 60 of the secondary sleeve section 48 could include a radius or combination of curvatures which would inhibit marring of the blind side surface 62 of workpiece 40 as the bulb forms. It should also be noted that the secondary sleeve section 48 could be selectively annealed along its length L1 to provide a hardness gradient between it and the primary sleeve section 46. In addition, lubricants are provided between the engaging surfaces of main sleeve 14 and expandable sleeve 16 to reduce the forces required to expand and bulb the expandable sleeve 16.

In one form of the invention the leading edge 60 was formed with a surface inclined axially rearwardly and radially outwardly at an angle B of between around 4° to around 10° with a line transverse to the fastener axis X. It is believed that this avoids angular point contact inhibiting surface damage from highly localized loads.

The primary sleeve section 46 of the expandable sleeve 16 has an end portion 68 of an outside diameter D5 slightly less than the diameter D2 of the remaining portion 69. This slight difference in diameters is also a result of hardening the two sections via cold working by a rolling operation to be described. In one form of the invention the expandable sleeve 16 could be constructed of 304 stainless steel having strength characteristics to be defined and having dimensional characteristics within the following ranges, in inches, with the "−06" designating a nominal diameter for the fastener, i.e. 6/32 of an inch:

TABLE I

| $D_1$ | $D_2$ | $D_3$ | $D_4$ | $D_5$ | $L_1$ (Min.) | $L_2$ | $L_3$ | $L_4$ | $L_5$ | $L_6$ |
|---|---|---|---|---|---|---|---|---|---|---|
| .196 | .1935 | .1635 | .140 | .189 | .135 | .385 | .235 | .050 | ($L_3$–$L_4$) | .95 |
| .195 | | .1620 | .138 | | .130 | .380 | .230 | .045 | | |

The designations of diameters D1 through D5 and lengths L1 through L5 are shown in FIG. 1.

The pin member 12 could be constructed of A286 stainless steel, solution treated and aged to a minimum ultimate shear strength of around 95 KSI. It should be understood, however, that other suitable materials such as titanium alloys could be employed. The main sleeve or nut member 14 in one form of the invention could be constructed of 6A1-4V titanium alloy which was solution treated and aged to have a minimum ultimate shear strength of around 95 KSI.

In one form of the invention and with the expandable sleeve 16 dimensioned as noted, the pin member 12 could be provided with a major thread diameter D6 of between around 0.1335" and 0.1355". The outside diameter D7 of pin head 18 is slightly larger than the outside diameters D2 and D5 of primary sleeve section 46. In one form the outside diameter D7 was between around 0.1940" to around 0.1970". Thus the underside surface 70 of pin head 18 will slightly overengage the end surface 72 of the end portion 68 of the primary sleeve section 46. Of course, the maximum outside diameter of fastener 10 is sufficiently less than diameters of workpiece bores 34 and 36 to facilitate initial location therein.

As noted it is desirable that the magnitude of relative axial load required to fold and eventually flatten the secondary sleeve section 48 be low in order to avoid high localized bearing stresses on the engaged blind side surface 62 of workpiece 40. This is to inhibit damage to surface 62 which, as described, is constructed of a crushable material. A substantially higher axial load, however is desirable to provide a high clamp load and ultimately a high retained clamp load on the workpieces 38, 40 after the fastener 10 has been set. Once the blind head 66 has been formed, however, these higher clamp loads can be applied without damage to the surface 62. This can be accomplished by the present invention and in one form of the invention the maximum magnitude of axial load applied to fold and collapse the secondary sleeve section 46 was no greater than around 60% of the maximum axial load to finally install the fastener 10, i.e. to cause pin break at breakneck 26.

The preceding dimensional Chart I, other dimensions and noted materials are exemplary only since other equivalent fasteners could be constructed for the same or different sizes and different materials generally following the preceding teachings.

As noted, the expandable sleeve 16 is formed with the primary sleeve section 46 generally having a higher hardness and of a higher strength than the secondary sleeve section 48. In one form of the invention the expandable sleeve 16 for the "−06" sized noted, was constructed from a solid blank of 304 stainless steel and having an outside contour generally approximating that of the expandable sleeve 16 as shown in FIG. 1 but having a uniform diameter D1. The blank is solution treated to have a hardness of around 65 to around 70 Rb on the Rockwell "b" scale. Portions of the blank corresponding to the end portion 68 and remaining portion 69 of the primary sleeve section 46 are then surface cold worked with rollers to selectively work harden those portions to a higher hardness and higher ultimate shear strength than the remainder of the blank. Next the bores 54 and 56 are drilled resulting in the expandable sleeve 16 of the construction of FIG. 1 The end portion 68 is rolled and work hardened slightly more than portion 69 to provide a slight further increase in hardness and strength relative to the remaining portion 69 of the primary sleeve section 46. In this regard the diameters D2 and D5 of portions 69 and 68, respectively, of primary sleeve section 46 are slightly, progressively smaller than diameter D1 of secondary sleeve section 48.

In the described "−06" form of the invention the remaining portion 69 was of a surface hardness of between around 75 to around 80 Rb on the Rockwell "b" scale. With this difference in hardness, the primary sleeve section 46 will substantially not buckle or deform radially inwardly under the required installation loads. In this way the integrity of the primary sleeve section 46 is maintained providing for the formation of a resultant blind head 66 of a large diameter with a substantial bearing area in contact with the confronting surface 62 of workpiece 40. Thus a minimum differential of around 15% in hardness between the surface hardened portion 69 of primary sleeve section 46 and the secondary sleeve section 48 is desirable. Note that the preceding hardnesses are by way of example for a "−06" nominal size fastener and can vary for fasteners of different sizes and/or of different materials. It is important, however, that the relative strengths of the primary and secondary sleeve sections be constructed with the sufficient differential in strength to promote folding of the secondary sleeve section 48 while precluding radial inward movement and buckling of the primary sleeve section 46.

As noted by maintaining the integrity of the primary sleeve section 46 during installation, the capability of the set fastener to resist lap shear loads on the workpieces 38 and 40 and the resultant combination loads will be increased over a comparable fastener where the expandable sleeve has been solution treated to be substantially of a uniformly soft construction.

Both the underside surface 70 of the pin head 18 and the sleeve end surface 72 are flat or angled slightly axially forwardly and radially outwardly at an angle C relative to a line transverse with the axis X. In one form, the angle C was around 7°; however an angle C of between around 0° to around 10° could be utilized. With this angulation and the slight difference in outside diameters D5 and D7 the material of the outer end portion 68 of expandable sleeve 16 will be captured underneath the pin head 18 and urged generally radially inwardly in response to the relative axial installation force. As noted the end portion 68 is of a higher hardness than the remaining portion 69 and in one form of the invention was of a hardness around 5 Rb higher than remaining portion 69. With the end portion 68, being of a higher hardness than the remainder of the primary sleeve section 46 it will resist deformation from the compressive forces of the confronting, engaged surface 70 of the pin 12 and thus will resist partial or complete pin pull through. At the same time it also provide a good bearing surface for the relative rotation of the pin head 18 from torquing during installation. In this regard an end portion of increased hardness has been used with prior art constructions. The dimensional relationship of the end portion 68 to the hardened portion 69 can be determined from the prior Table I and related description.

Figure 4:
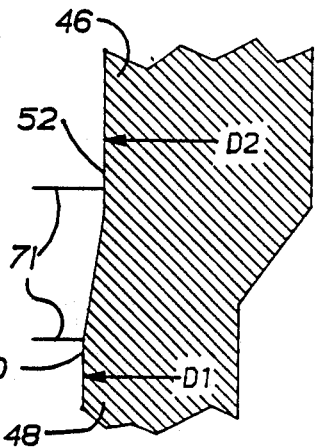
FIG. 4 is an enlarged fragmentary view of that portion of the fastener of FIG. 1 in the area indicated by the arrow 4 depicting the transition area from the soft to hard sections of the expandable sleeve.

As can be seen from FIG. 4, the transition area 71 provides for a relatively smooth, tapered transition in wall thickness between the thicker walled primary sleeve section 46 and the thinner walled secondary sleeve section 48. The length of the transition area 71 is determined by the difference between length L2 and the sum of lengths L1 and L3, i.e. Length of Transition Area $71 = L2 - (L1 + L3)$. Thus in example given the length of transition area 71 would be between around 0.1" to around 0.025".

The fastener 10 of FIGS. 1 and 3 was depicted for securing workpieces 38 and 40 of maximum total thickness for the grip range of that fastener. Note that in this condition the axial travel of the pin 12 will be such that after the blind head 66 has been finally formed the breakneck groove 26 will be located near the outer surface 74 of the main sleeve head 28 such that the fractured end surface 76 of the threaded shank portion 20 will be generally in line with that outer surface 74; the length Y in FIG. 3 shows an acceptable slight tolerance deviation with the end surface 76 generally less than one thread pitch axially beyond from the outer workpiece surface 42. This will permit a visual and/or measurable indication that the fastener 10 has been properly utilized within the correct grip range. Thus, where the primary sleeve section 46 has maintained its integrity and the blind head has been properly formed, the fastener 10 will provide an indication that it has been properly utilized. For example, if the total thickness of the workpieces is greater than maximum for the grip range for the fastener 10, the pin break will occur within the enlarged sleeve head 28, axially inwardly from the outer surface 74. If the softer, solution treated construction were used in such an out-of-grip condition, the collapsing of the primary sleeve section could still locate the break surface of the pin near the outer surface of the main sleeve head such that a reliable, determinable indication would not be possible; see FIG. 6 and the discussion which follows.

A similar indication can be provided by the fastener 10 of the present invention in a minimum grip condition. This is shown in FIG. 5 where components similar to like components and serving similar functions to those shown in FIGS. 1 through 4 have been given the same numerical designation with the addition of the letter postscript "a". For purposes of simplicity not all of the components shall be described.

Looking now to FIG. 5 the fastener 10a has been shown after installation with a pair of workpieces 38a and 40a of a total thickness which is the minimum grip condition for the grip range of the fastener 10, 10a. Note that the blind head 66a has been similarly formed as blind head 66 and that there has been no radially inward deformation of the leading end 58a of primary sleeve section 46a and also no column buckling of that section. In this regard the blind head 66a will have a desirable large footprint or engaged surface of a radial length Ra similar in extent to that length R of the embodiment of FIG. 3; also the blind head 66a provides a large outside diameter DRa which is larger than diameter DR because of the greater travel involved of expandable sleeve 16a to initially engage the blind side surface 62a.

The axial travel of the pin 12a will be greater than that of fastener 10 in the maximum grip condition of FIGS. 1 and 3 such that its fractured end surface 76a will extend beyond the outer surface 74a of the main sleeve head 28a. However, the protrusion beyond the outer surface 74a is within a determinable maximum protrusion Ya. Again by maintaining the integrity of the primary sleeve section 46, this determinable maximum protrusion Ya can be used to provide an indication that the correct fastener has been used for the particular combined thickness of the workpieces. Thus in all other grip conditions between the maximum grip of FIG. 3 and minimum grip of FIG. 5 the end surface 76, 76a will be within the specified range of Y to Ya.

Note that the threaded pin shank portion 20a is threaded for a sufficient distance whereby overtravel of the pin 12a will occur if the workpieces are less than the minimum grip condition. In this regard the threaded portion 20a is of a length such that after the maximum desired travel of the pin 12a in the minimum grip condition of FIG. 5, there will still be at least around two full threads remaining between the pin head 18a and the nose portion 32a; this will assure that the pin 12a will have the capability of overtravelling in an out-of-grip which is less than minimum grip whereby it can flag or indicate an improper installation, i.e. for workpieces of a total thickness less than the minimum grip condition for the fastener.

The preceding is in contrast to those prior art fasteners which have been generally uniformly softened by solution treating or otherwise. This is depicted in FIGS. 6 and 7 where components similar to like components in the embodiments of FIGS. 1-4 and 5 have been given the same numerical designation with the addition of the letter postscripts "b" and "c", respectively.

Looking now to FIG. 6, a fastener 10b having a configuration generally similar to fastener 10, 10a is shown in an installed assembled relationship with workpieces 38b and 40b having a combined thickness defining the maximum grip condition for the grip range of the fastener. It can be seen that the primary sleeve section 46b has buckled and the leading end 58b has deformed radially inwardly. In this regard it is believed that the leading end 58b begins to deform radially inwardly as it moves past the tapered nose portion 32b of the main sleeve or nut member 14b. This is responsible for the deflection of the folded portion 66b' away from the surface 62b. The result is a blind head 66b having a footprint or engaged area of a radial length Rb which is substantially less than the radial lengths R, Ra of the embodiment of the present invention of FIGS. 1–4 and 5. At the same time, this radial inward deflection of the primary sleeve section 46b results in the blind head 66b having an effective outside diameter DRb which is substantially smaller than diameters DR and DRa.

In addition, because of the buckling of the primary sleeve section 46b, the fractured end 76b of the pin shank portion 20b will extend a distance Yb which is not determinable within a reasonably effective range because of the unpredictability of the amount of buckling of the primary sleeve section 46b. In this regard the buckling could be to such an extent that the pin head 18b would engage the tapered nose portion 32b. Thus in a condition where the combined thicknesses of the workpieces 38b, 40b is greater than the maximum grip for the fastener 10b, the protrusion Yb could incorrectly indicate a proper installation.

A similar result will be obtained when the prior art fastener is used with workpieces in a minimum grip condition within the grip range. Looking now to FIG. 7, a fastener 10c being of the same configuration and construction of fastener 10b is shown in assembled relationship with workpieces 38c and 40c having a combined thickness defining the minimum grip condition for the grip range of the fastener. Again it can be seen that the primary sleeve section 46c has buckled and the leading end 58c has deformed radially inwardly. In this regard it is also believed that the leading end 58c begins to deform radially inwardly as it moves past the tapered nose portion 32c of the main sleeve or nut member 14c. As noted before, this is responsible for the deflection of the folded portion 66c' away from the surface 62c. The result is a blind head 66c having a footprint or engaged area of a radial length Rc, which as with blind head 66b, is substantially less than the radial lengths R, Ra of the embodiment of the present invention of FIGS. 4 and 5; similarly, the blind head 66c provides an effective outside diameter DRc which is substantially smaller than diameters DR and DRa.

Because of the buckling of the primary sleeve section 46c, the fractured end 76c of the pin shank portion 20c can extend a distance Yc which is excessive and which is not determinable within a reasonably effective range because of the unpredictability of the amount of buckling of the primary sleeve section 46c. Thus in a condition where the combined thicknesses of the workpieces 38c, 40c is less than the minimum grip for the fastener 10c, variations in buckling and hence final pin position could provide a protrusion similar in length to Yc. Thus, again the protrusion Yc would not reliably provide an indication that the fastener has been used in a proper or improper grip condition.

Thus, with both the maximum grip condition of FIG. 6 and the minimum grip condition of FIG. 7, the primary section 46b, 46c buckles and deforms radially inwardly. The resistance of this buckled and deformed structure to twisting and bending loads, which can occur when the fastened workpieces are subjected to lap shear loads, will be less than that of the fastener 10, 10a constructed in accordance with the present invention.

While it will be apparent that the preferred embodiment of the invention disclosed is well calculated to fulfill the objects above stated, it will be appreciated that the invention is susceptible to modification, variation and change without departing from the proper scope or fair meaning of the invention.

What is claimed is:

1. A blind fastener for securing a plurality of workpieces at a desired clamp load with the workpieces having aligned openings therein and having an accessible surface and a blind side surface with the blind side surface defined by a workpiece of crushable material, said fastener comprising:

a pin member having an elongated pin shank terminating at one end in an enlarged pin head;

a main sleeve member having an elongated sleeve shank terminated at one end in an enlarged head adapted to engage the accessible surface on one of the workpieces, said sleeve shank terminating at its opposite end in a tapered nose portion, said sleeve shank adapted to be located in the aligned bores in the workpieces, said main sleeve member having a first central through bore adapted to receive said pin shank, a stop surface located generally at the blind side surface of the workpiece of crushable material, an expandable sleeve member having a second central through bore and adapted to be located on said pin shank adjacent said pin head, said expandable sleeve member having a primary sleeve section adapted to be located adjacent said pin head and a secondary sleeve section adapted to be located adjacent said nose portion of said main sleeve member, said fastener adapted to be set by a relative axial force applied between said pin member and said main and expandable sleeves, said secondary sleeve section adapted to move axially over said nose portion and engage said stop surface and to fold at a first preselected magnitude of said relative axial force and to be generally flattened to define an enlarged flattened blind head bearing against the blind side surface over substantially the full area of said flattened blind head, said fastener adapted to be finally set at a second preselected magnitude of said relative axial force greater than said first preselected magnitude, said primary sleeve section beginning at the leading end portion thereof adjacent said secondary sleeve section having a hardness and hence strength substantially greater than that of said secondary sleeve section whereby said leading end portion of said primary sleeve section will be substantially continuously radially expanded beyond said sleeve shank as said primary sleeve section moves past said nose portion and further whereby buckling of said primary sleeve section is substantially precluded in response to said relative axial force.

2. The fastener of claim 1 with said secondary sleeve section having a wall thickness less than that of said primary sleeve section.

3. The fastener of claim 1 with said primary sleeve section having a hardness generally at least around 15% greater than the hardness of said secondary sleeve section.

4. The fastener of claim 1 with said primary sleeve section having an end portion engageable with said pin head and with said end portion being of a higher hardness than the remainder of said primary sleeve section.

5. The fastener of claim 1 with with said secondary sleeve section having a wall thickness less than that of said primary sleeve section and with said primary sleeve section connected to said secondary sleeve section by an externally tapered surface.

6. The fastener of claim 1 with said secondary sleeve section having an outside diameter slightly larger than the outside diameter of said primary sleeve section, said primary sleeve section being connected to said secondary sleeve section by an externally tapered surface.

7. The fastener of claim 1 with said first preselected magnitude of relative axial force being no greater than around 60% of said second preselected magnitude of relative axial force.

8. The fastener of claim 1 with said primary sleeve section having a substantially larger cross-sectional area than that of said secondary sleeve section.

9. A blind fastener for securing a plurality of workpieces at a desired clamp load with the workpieces having aligned openings therein and having an accessible surface and a blind side surface with the blind side surface defined by a workpiece of crushable material, the blind fastener having a preselected grip and a grip range around the preselected grip with the workpieces to be secured by the fastener having a combined thickness varying from a maximum thickness to a minimum thickness which variations in thickness define the limits of the grip range said fastener comprising:

a pin member having an elongated pin shank terminating at one end in an enlarged pin head;

a main sleeve member having an elongated sleeve shank terminating at one end in an enlarged head adapted to engage the accessible surface on one of the workpieces, said sleeve shank terminating at its opposite end in a tapered nose portion, said sleeve shank adapted to be located in the aligned bores in the workpieces, said main sleeve member having a first central through bore adapted to receive said pin shank, a stop surface located generally at the blind side surface of the workpiece of crushable material, an expandable sleeve member having a second central through bore and adapted to be located on said pin shank adjacent said pin head, said expandable sleeve member having a primary sleeve section adapted to be located adjacent said pin head and a secondary sleeve section adapted to be located adjacent said nose portion of said main sleeve member, said fastener adapted to be set by a relative axial force applied between said pin member and said main and expandable sleeves, said secondary sleeve section adapted to move axially over said nose portion and engage said stop surface and to fold at a first preselected magnitude of said relative axial force and to be generally flattened to define an enlarged flattened blind head bearing against the blind side surface over substantially the full area of said flattened blind head, said fastener adapted to be finally set at a second preselected magnitude of said relative axial force greater than said first preselected magnitude, said primary sleeve section having a hardness and hence strength substantially greater than that of said secondary sleeve section whereby buckling of said primary sleeve section is substantially precluded in response to said second preselected magnitude of said relative axial force, said pin member moving axially relative to said main sleeve member in response to said relative axial force, said pin member having an outer end which after final installation will be located at a first predictable position at the accessible surface side of the workpieces for workpieces of a maximum total thickness on one end of the grip range and having a second predictable position at said accessible surface side of the workpieces for workpieces of a minimum total thickness whereby the final position of said pin member will provide a visual indication of the use of the fastener with workpieces having a combined thickness within the grip range of the fastener, said first predictable position being substantially at the accessible end of said enlarged head of said main sleeve member and with said second predictable position being a predetermined length axially outwardly from said accessible end of said enlarged head of said main sleeve member, said first preselected magnitude of relative axial force being no greater than around 60% of said second preselected magnitude of relative axial force, said primary sleeve section having a hardness and hence strength whereby radial inward movement of the leading end of said primary sleeve section as it moves past said nose portion is substantially precluded.

10. A blind fastener for securing a plurality of workpieces at a desired clamp load with the workpieces having aligned openings therein and having an accessible surface and a blind side surface with the blind side surface defined by a workpiece of crushable material, said fastener comprising:

a pin member having an elongated pin shank terminating at one end in an enlarged pin head;

a main sleeve member having an elongated sleeve shank terminating at one end in an enlarged head adapted to engage the accessible surface on one of the workpieces, said sleeve shank terminating at its opposite end in a tapered nose portion, said sleeve shank adapted to be located in the aligned bores in the workpieces, said main sleeve member having a first central through bore adapted to receive said pin shank, a stop surface located generally at the blind side surface of the workpiece of crushable material, an expandable sleeve member having a second central through bore and adapted to be located on said pin shank adjacent said pin head, said expandable sleeve member having a primary sleeve section adapted to be located adjacent said pin head and a secondary sleeve section adapted to be located adjacent said nose portion of said main sleeve member, said fastener adapted to be set by a relative axial force applied between said pin member and said main and expandable sleeves, said secondary sleeve section adapted to move axially over said nose portion and engage said stop surface and to fold at a first preselected magnitude of said relative axial force and to be generally flattened to define an enlarged flattened blind head bearing against the blind side surface over substantially the full area of said flattened blind head, said fastener applied to be finally set at a second preselected magnitude of said relative axial force greater than said first preselected magnitude, said primary sleeve section having a hardness and hence strength substantially greater than that of said secondary sleeve section whereby radial inward movement of the leading end of said primary sleeve section as it moves past said nose portion is substantially precluded and further whereby buckling of said primary sleeve section is substantially precluded in response to said second preselected magnitude of said relative axial force, said expandable sleeve member when constructed of 304 stainless steel and having the dimensions of D1, D2, D3, D4 and D5 and L1, L2, L3, L4 and L5 wherein:

D1 is the outer diameter of said secondary sleeve section,

D2 is the outer diameter of said primary sleeve section,

D3 is the inner diameter of said secondary sleeve section,

D4 is the inner diameter of said primary sleeve section,

D5 is the outer diameter of said end portion,

L1 is the length of said secondary sleeve portion,

L2 is the length of said expandable sleeve member,

L3 is the length of said primary sleeve portion,

L4 is the length of said end portion,

L5 is L3−L4, said dimensions, in inches for a fastener having a nominal diameter of "−06", being generally within the following ranges:

| $D_1$ | $D_2$ | $D_3$ | $D_4$ | $D_5$ | $L_1$ (Min.) | $L_2$ | $L_3$ | $L_4$ | $L_5$ |
|---|---|---|---|---|---|---|---|---|---|
| .196 | .1935 | .1635 | .140 | .189 | .135 | .385 | .235 | .050 | (L3−L4) |
| .195 | | .1620 | .138 | | .130 | .380 | .230 | .045. | |

11. The fastener of claim 10 with said primary sleeve section having a hardness generally at least around 15% greater than the hardness of said secondary sleeve section and with said secondary sleeve section having a wall thickness less than that of said primary sleeve section whereby buckling of said primary sleeve section is substantially precluded and further whereby radial inward movement of the leading end of said primary sleeve section as it moves past said nose portion is substantially precluded.

12. The blind fastener of claim 10 when said pin member is constructed of A286 stainless steel and said main sleeve member being constructed of Beta-C titanium alloy and with diameters D6 and D7 as shown in the drawings generally within a range, in inches, as follows:

| D6 | D7 |
|---|---|
| .1335" | .1940" |
| .1355" | .1970" | and with length L6 of said tapered nose portion as shown in the drawing being generally around 0.95".

13. The fastener of claim 10 with said first preselected magnitude of relative axial force being no greater than around 60% of said second preselected magnitude of relative axial force.

14. A blind fastener for securing a plurality of workpieces at a desired clamp load with the workpieces having aligned openings therein and having an accessible surface and a blind side surface, said fastener comprising:

a pin member having an elongated pin shank terminating at one end in an enlarged pin head;

a main sleeve member having an elongated sleeve shank terminating at one end in an enlarged head adapted to engage the accessible surface on one of the workpieces, said sleeve shank terminating at its opposite end in a tapered nose portion, said sleeve shank adapted to be located in the aligned bores in the workpieces, said main sleeve member having a first central through bore adapted to receive said pin shank, a stop surface located generally at the blind side surface of the workpieces, an expandable sleeve member having a second central through bore and adapted to be located on said pin shank adjacent said pin head, said expandable sleeve member having a primary sleeve section adapted to be located adjacent said pin head and a secondary sleeve section adapted to be located adjacent said nose portion of said main sleeve member, said fastener adapted to be set by a relative axial force applied between said pin member and said main and expandable sleeves, said secondary sleeve section adapted to move axially over said nose portion and engage said stop surface and to fold upon the application of said relative axial force and to be generally flattened to define an enlarged flattened blind head bearing against the blind side surface over substantially the full area of said flattened blind head, said primary sleeve section beginning at the leading end portion thereof adjacent said secondary sleeve section having a hardness and hence strength substantially greater than that of said secondary sleeve section whereby said primary sleeve section will be substantially continuously radially expanded beyond said sleeve shank as said primary sleeve section moves past said nose portion, thereby causing said enlarged flattened blind head to form upon a fold which throughout the axial movement of said primary sleeve section substantially continuously increases radially outwardly.

15. A blind fastener for securing a plurality of workpieces at a desired clamp load with the workpieces having aligned openings therein and having an accessible surface and a blind side surface with the blind side surface defined by a workpiece of crushable material, said fastener comprising:

a pin member having an elongated pin shank terminating at one end in an enlarged pin head;

a main sleeve member having an elongated sleeve shank terminating at one end in an enlarged head adapted to engage the accessible surface on one of the workpieces, said sleeve shank terminating at its opposite and in a tapered nose portion, said sleeve shank adapted to be located in the aligned bores in the workpieces, said main sleeve member having a first central through bore adapted to receive said pin shank, a stop surface located generally at the blind side surface of the workpiece of crushable material, an expandable sleeve member having a second central through bore and adapted to be located on said pin shank adjacent said pin head, said expandable sleeve member having a primary sleeve section adapted to be located adjacent said pin head and a secondary sleeve section adapted to be located adjacent said nose portion of said main sleeve member, said fastener adapted to be set by a relative axial force applied between said pin member and said main and expandable sleeves, said secondary sleeve section adapted to move axially over said nose portion and engage said stop surface and to buckle at a first preselected magnitude of said relative axial force and to be generally flattened to define an enlarged flattened blind head bearing against the blind side surface over substantially the full area of said flattened blind head, said fastener adapted to be finally set at a second preselected magnitude of said relative axial force greater than said first preselected magnitude, said primary sleeve section at the leading end portion thereof adjacent said secondary sleeve section having a hardness substantially greater than that of said secondary sleeve section and having a substantially larger cross-sectional area than that of said secondary sleeve section whereby said leading end portion of said primary sleeve section will be substantially continuously radially expanded beyond said sleeve shank as said primary sleeve section moves past said nose portion.

16. The fastener of claim 15 with said first preselected magnitude of relative axial force being no greater than around 60% of said second preselected magnitude of relative axial force.

17. A blind fastener for securing a plurality of workpieces at a desired clamp load with the workpieces having aligned openings therein and having an accessible surface and a blind side surface with the blind side surface defined by a workpiece of crushable material, the blind fastener having a preselected grip and a grip range around the preselected grip with the workpieces to be secured by the fastener having a combined thickness varying from a maximum thickness to a minimum thickness which variations in thickness define the limits of the grip range, said fastener comprising:

a pin member having an elongated pin shank terminating at one end in an enlarged pin head;

a main sleeve member having an elongated sleeve shank terminating at one end in an enlarged head adapted to engage the accessible surface on one of the workpieces, said sleeve shank terminating at its opposite end in a tapered nose portion, said sleeve shank adapted to be located in the aligned bores in the workpieces, said main sleeve member having a first central through bore adapted to receive said pin shank, a stop surface located generally at said blind side surface of the workpiece of crushable material, an expandable sleeve member having a second central through bore and adapted to be located on said pin shank adjacent said pin head, said expandable sleeve member having a primary sleeve section adapted to be located adjacent said pin head and a secondary sleeve section adapted to be located adjacent said nose portion of said main sleeve member, said fastener adapted to be set by a relative axial force applied between said pin member and said main and expandable sleeve, said secondary sleeve section adapted to move axially over said nose portion and engage said stop surface and to fold at a first preselected magnitude of said relative axial force and to be generally flattened to define an enlarged flattened blind head bearing against the blind side surface over substantially the full area of said flattened blind head, said fastener adapted to be finally set at a second preselected magnitude of said relative axial force greater than said first preselected magnitude, said primary sleeve section beginning at the leading end portion thereof adjacent said secondary sleeve section having a hardness and hence strength substantially greater than that of said secondary sleeve section whereby said leading end portion of said primary sleeve section will be substantially continuously radially expanded beyond said sleeve shank as said primary sleeve section moves past said nose portion and further whereby buckling of said primary sleeve section is substantially precluded in response to said second preselected magnitude of said relative axial force, said pin member moving axially relative to said main sleeve member in response to said relative axial force, said pin member having an outer end which after final installation will be located at a first predictable position at the accessible surface side of the workpieces for workpieces of a maximum total thickness on one end of the grip range and having a second predictable position at the accessible surface of the workpieces for workpieces of a minimum total thickness whereby the final position of said pin member will provide a visual indication of the use of the fastener with workpieces having a combined thickness within the grip range of the fastener.

18. A blind fastener for securing a plurality of workpieces at a desired clamp load with the workpieces having aligned openings therein and having an accessible surface and a blind side surface with the blind side surface defined by a workpiece of crushable material, said fastener comprising:

a pin member having an elongated pin shank terminating at one end in an enlarged pin head;

a main sleeve member having an elongated sleeve shank terminating at one end in an enlarged head adapted to engage the accessible surface on one of the workpieces, said sleeve shank terminating at its opposite end in a tapered nose portion, said sleeve shank adapted to be located in the aligned bores in the workpieces, said main sleeve member having a first central through bore adapted to receive said pin shank, a stop surface located generally at the blind side surface of the workpiece of crushable material, an expandable sleeve member having a second central through bore and adapted to be located on said pin shank adjacent said pin head, said expandable sleeve member having a primary sleeve section adapted to be located adjacent said pin head and a secondary sleeve section adapted to be located adjacent said nose portion of said main sleeve member, said fastener adapted to be set by a relative axial force applied between said pin member and said main and expandable sleeves, said secondary sleeve section adapted to move axially over said nose portion and engage said stop surface and to fold at a first preselected magnitude of said relative axial force and to be generally flattened to define an enlarged flattened blind head bearing against the blind side surface over substantially the full area of said flattened blind head, said fastener adapted to be finally set at a second preselected magnitude of said relative axial force greater than said first preselected magnitude, said primary sleeve section having a hardness and hence strength substantially greater than that of said secondary sleeve section whereby radial inward movement of the leading end of said primary sleeve section as it moves past said nose portion is substantially precluded and further whereby buckling of said primary sleeve section is substantially precluded in response to said second preselected magnitude of said relative axial force, and said second sleeve section having an outside diameter slightly larger than the outside diameter of said primary sleeve section, said primary sleeve section being connected to said secondary sleeve section by an externally tapered surface.

19. The fastener of claim 18 with said secondary sleeve section having a wall thickness less than that of said primary sleeve section.

20. The fastener of claim 18 with said primary sleeve section having a hardness generally at least around 15% greater than the hardness of said secondary sleeve section.

21. The fastener of claim 18 with said primary sleeve section having an end portion engageable with said pin head and with said end portion being of a higher hardness than the remainder of said primary sleeve section.

22. The fastener of claim 18 with with said secondary sleeve section having a wall thickness less than that of said primary sleeve section and with said primary sleeve section connected to said secondary sleeve section by an externally tapered surface.

23. The fastener of claim 18 with said first preselected magnitude of relative axial force being no greater than around 60% of said second preselected magnitude of relative axial force.

24. A blind fastener for securing a plurality of workpieces at a desired clamp load with the workpieces having aligned openings therein and having an accessible surface and a blind side surface with the blind side surface defined by a workpiece of crushable material, the blind fastener having a preselected grip and a grip range around the preselected grip with the workpieces to be secured by the fastener having a combined thickness varying from a maximum thickness to a minimum thickness which variations in thickness define the limits of the grip range, said fastener comprising:

a pin member having an elongated pin shank terminating at one end in an enlarged pin head;

a main sleeve member having an elongated sleeve shank terminating at one end in an enlarged head adapted to engage the accessible surface on one of the workpieces, said sleeve shank terminating at its opposite end in a tapered nose portion, said sleeve shank adapted to be located in the aligned bores in the workpieces, said main sleeve member having a first central through bore adapted to receive said pin shank, a stop surface located generally at the blind side surface of the workpiece of crushable material, an expandable sleeve member having a second central through bore and adapted to be located on said pin shank adjacent said pin head, said expandable sleeve member having a primary sleeve section adapted to be located adjacent said pin head and a secondary sleeve section adapted to be located adjacent said nose portion of said main sleeve member, said fastener adapted to be set by a relative axial force applied between said pin member and said main and expandable sleeves, said second sleeve section adapted to move axially over said nose portion and engage said stop surface and to fold at a first preselected magnitude of said relative axial force and to be generally flattened to define an enlarged flattened blind head bearing against the blind side surface over substantially the full area of said flattened blind head, said fastener adapted to be finally set at a second preselected magnitude of said relative axial force greater than said first preselected magnitude, said primary sleeve section having a hardness and hence strength substantially greater than that of said secondary sleeve section whereby buckling of said primary sleeve section is substantially precluded in response to said second preselected magnitude of said relative axial force, said pin member moving axially relative to said main sleeve member in response to said relative axial force, said pin member having an outer end which after final installation will be located at a first predictable position at the accessible surface side of the workpieces for workpieces a maximum total thickness on one end of the grip range and having a second predictable position at the accessible surface of the workpieces for workpieces of a minimum total thickness whereby the final position of said pin member will provide a visual indication of the use of the fastener with workpieces having a combined thickness within the grip range of the fastener, and said first predictable position being substantially at the accessible end of said enlarged head of said main sleeve member and with said second predictable position being a predetermined length axially outwardly from said accessible end of said enlarged head of said main sleeve member.

25. The fastener of claim 24 with said first preselected magnitude of relative axial force being no greater than around 60% of said second preselected magnitude of relative axial force.

26. The fastener of claim 24 with said primary sleeve section having a hardness and hence strength whereby radial inward movement of the leading end of said primary sleeve section as it moves past said nose portion is substantially precluded.

* * * * *